United States Patent [19]

Hayashi et al.

[11] Patent Number: 5,062,367

[45] Date of Patent: Nov. 5, 1991

[54] AIR BAG INFLATION GAS GENERATOR

[75] Inventors: Minoru Hayashi; Mitoshi Matsufuji; Sakae Takahashi, all of Shirakawa; Koichi Kamiji, Wako; Kouichi Kobari, Shirakawa; Junichi Kishimoto, Shirakawa; Michio Shioda, Shirakawa; Masaaki Kawaguchi, Wako, all of Japan

[73] Assignee: Nippon Koki, Co., Ltd., Tokyo, Japan

[21] Appl. No.: 444,706

[22] Filed: Dec. 1, 1989

[30] Foreign Application Priority Data

Dec. 5, 1988 [JP] Japan ............................. 63-309091
Dec. 5, 1988 [JP] Japan ............................. 63-309092
Dec. 5, 1988 [JP] Japan ............................. 63-309094

[51] Int. Cl.$^5$ ........................... C06D 5/00; F42B 3/04
[52] U.S. Cl. .................................. 102/530; 280/741; 422/164
[58] Field of Search ................ 102/530, 531; 280/731, 280/736, 740, 741, 742; 422/164, 165, 166, 167

[56] References Cited

U.S. PATENT DOCUMENTS 3,845,970 11/1974 Herrmann ........................... 280/741
3,985,076 10/1976 Schneiter et al. ................... 280/741
4,278,638 7/1981 Nilsson et al. ...................... 280/736
4,590,041 5/1986 Hill ..................................... 422/165
4,902,036 2/1990 Zander et al. ...................... 280/740

Primary Examiner—Harold J. Tudor
Attorney, Agent, or Firm—Kalish & Gilster

[57] ABSTRACT

This invention relates to an air bag inflation gas generator to feed gas for inflation of air bags such as air bags for absorbing collision shocks, life jackets, rafts, and escape chutes. The air bag inflation gas generator according to the present invention has a combustion chamber comprising a bottom-closed cylinder of a housing body and a lid covering the opening of the bottom-closed cylinder. The housing body comprises the bottom-closed cylinder, a flange extending outward and formed integrally with the opening of the bottom-closed cylinder, and an external cylinder formed on the periphery of the flange and bent toward the bottom of the housing body. A plenum chamber is formed by covering the external and bottom-closed cylinders with a covering member from the bottom of the housing body and by welding the covering member to the cylinders.

8 Claims, 7 Drawing Sheets

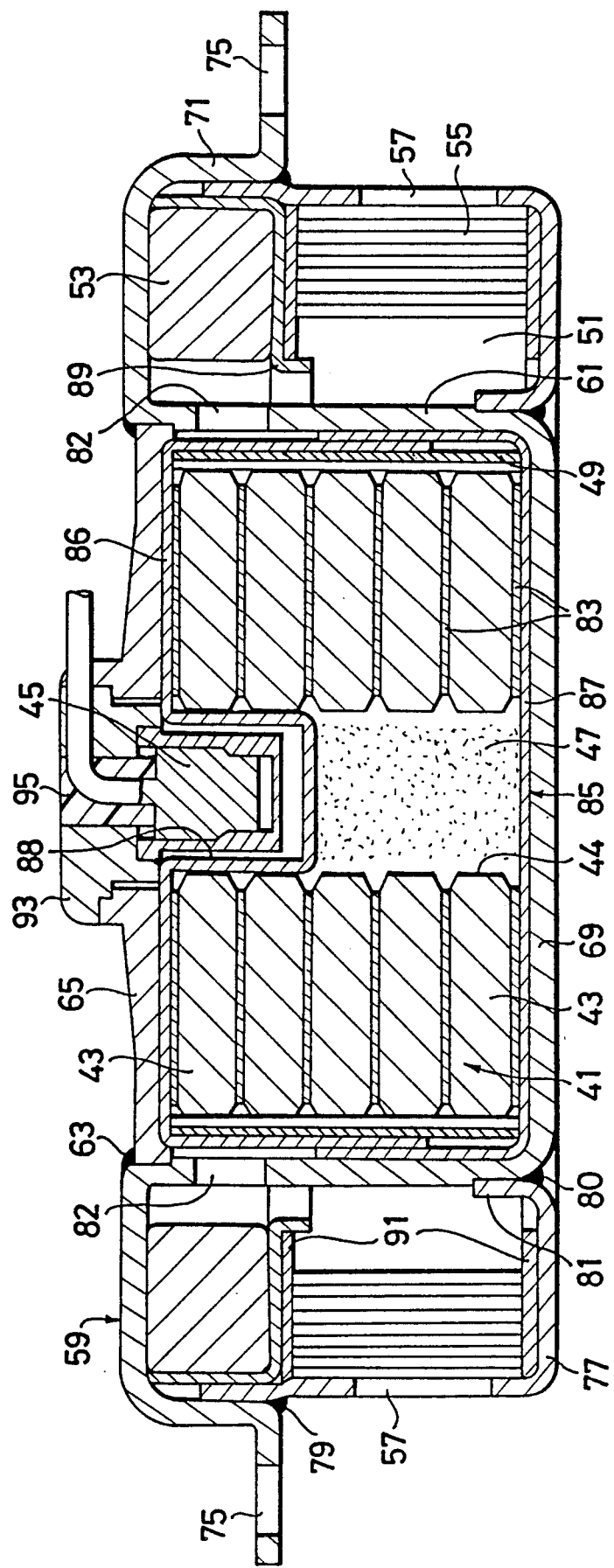

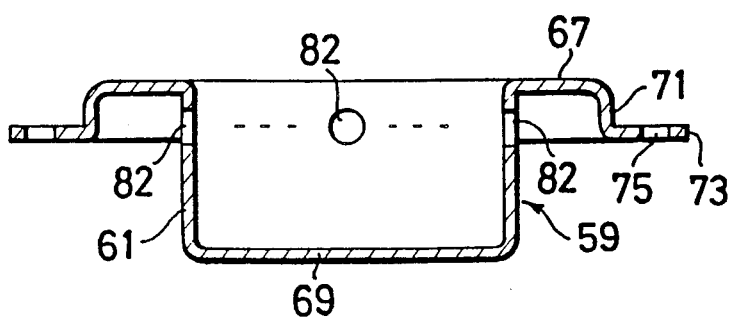
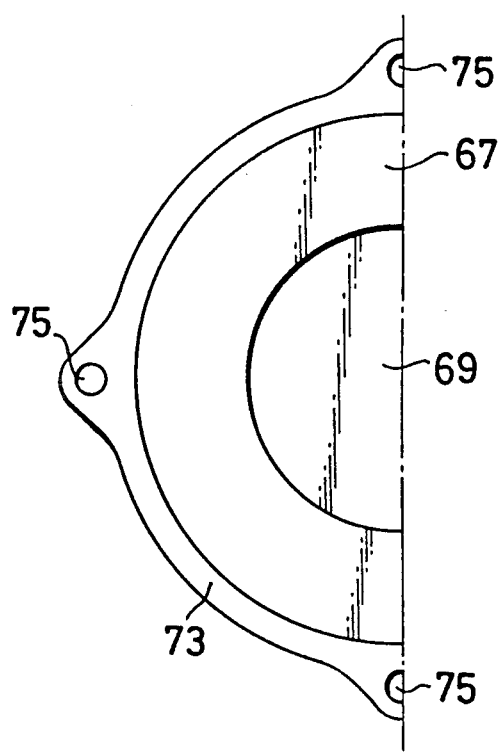
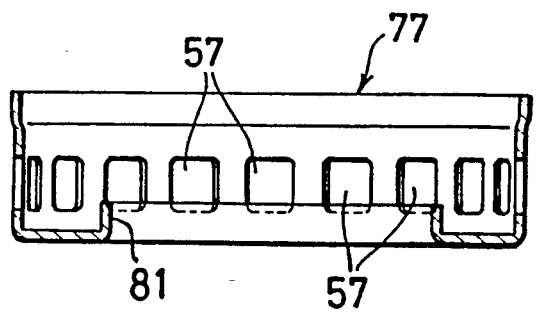

AIR BAG INFLATION GAS GENERATOR

BACKGROUND OF THE INVENTION

1. Field of the Invention

This invention relates to an air bag inflation gas generator to feed gas for inflation of air bags such as air bags for absorbing collision shocks, life jackets, rafts, and escape chutes.

2. Description of the Prior Art

A prior shock absorber to protect a passenger car driver from shocks at collision accidents comprises an air bag, for example, having a capacity of 60 liters and a gas generator to inflate the air bag with gas. At a collision accident, explosives or other gas generating agents having a similar composition thereto, which are charged in the gas generator, are ignited and burnt to produce some gas. The air bag is instantaneously inflated by the resultant gas for driver protection against any collision shocks, which can avoid possible serious injury.

FIG. 13 shows a prior air bag inflation gas generator disclosed in the U.S. Pat. No. 4,296,084. In the drawing, the reference numeral 11 shows a combustion chamber containing a plurality of pellets of gas generating agent 13.

In the center of the combustion chamber 11, an igniter 15 and an ignition agent 17 are arranged to burn the gas generating agent 13. The combustion chamber 11 has also a combustion chamber filter 19 on its inner wall.

A plenum chamber 21 annularly surrounds the combustion chamber 11 and receives gas flow from the combustion chamber filter 19.

The plenum chamber 21 contains a gas filter (plenum chamber filter) 23 and further includes a plurality of gas outlets 25 to supply the gas flow from the gas filter 23 to an air bag.

In this type of air bag inflation gas generator, the ignition agent 17 burns when the igniter 15 is energized. The burning agent 17 in turn causes the gas generating agent 13 to burn and the resultant gas flows into the plenum chamber 21 through the combustion chamber filter 19 which is arranged on the inner wall of the combustion chamber 11. The gas is purified by the gas filter 23 in the plenum chamber 21 and flows into the air bag through the gas outlets 25. The air bag can be inflated completely within a very short time, for example, approximately 0.04 second.

That prior air bag inflation gas generator, however, has a housing body 27 comprising a covering member 29 and a housing cover 33 to form the combustion chamber 11 and the plenum chamber 21, and the covering member 29 and the housing cover 33 are screwed on each other through the engagement between an external thread 31 formed on the outer surface of the covering member 29 and an internal thread 35 formed on the inner surface of the cover 33. This housing construction increases not only the thickness of each portion where the thread 31 or 35 is formed, but the total thickness of the cover 33 and the covering member 29, resulting in a relatively large weight of the air bag inflation gas generator. In addition, the construction is an obstacle to providing a smaller gas generator.

For example, an air bag inflation gas generator to be installed in the steering wheel of an automobile has been highly requested to be lighter and smaller in order to improve the appearance and simplify the installation job. Nevertheless, such request has hardly been fulfilled due to the disadvantages described above.

In that prior air bag inflation gas generator, a large number of granules or pellets of gas generating agent 13 are charged in the combustion chamber 11. This produces large voids and as a result, requires a large size of the combustion chamber 11. This disadvantage also prevents production of smaller gas generators.

In addition, the prior air bag inflation gas generator employs a cartridge 28 to contain the gas generating agent 13 in the combustion chamber 11 and the cartridge 28 has a through hole 30 into which a plug 32 is fastened to support the igniter 15. To seal the cartridge 28 completely, therefore, a complicated sealing mechanism is required.

More specifically, if the gas generating agent 13 is moisturized when the air bag inflation gas generator installed in the steering wheel of an automobile is moisturized, the gas generator may not operate properly at a collision. Therefore, complete sealing of the gas generating agent 13 and the ignition agent 17 is highly requested.

Besides, the gas filter 23 which is installed in the plenum chamber 21 to filter the generated gas hardly provides enough cooling, dispersion and filtration of the combustion gas. To solve this problem, the prior air bag inflation gas generator is required to have a gas filter which ensures such functions.

Moreover, the gas filter is required to have low ventilation resistance to cool, disperse, and filter combustion gas enough because it is very hot and passes through it into the air bag at a high speed.

SUMMARY OF THE INVENTION

It is, therefore, an object of the present invention to provide a lighter and smaller air bag inflation gas generator with the thickness of both a housing body and a covering member reduced greatly.

It is another object of the present invention to provide an air bag inflation gas generator which employs a combustion chamber having a much smaller capacity.

It is still another object of the present invention to provide an air bag inflation gas generator which ensures good ignitability of a gas generating agent and enough exhaust passages for combustion gas.

It is a further object of the present invention to provide an air bag inflation gas generator which can cool the combustion gas enough and remove any combustion residue.

It is an even further object of the present invention to provide an air bag inflation gas generator which ensures complete sealing of the gas generating and ignition agents.

It is still a further object of the present invention to provide an air bag inflation gas generator wherein an igniter can be easily and properly arranged close to the ignition agent.

It is also another object of the present invention to provide an air bag inflation gas generator wherein the ignition agent can be easily and directly charged in a through hole of the gas generating agent.

It is still another object of the present invention to provide a gas filter for an air bag inflation gas generator which can cool, disperse and filter combustion gas enough.

BRIEF DESCRIPTION OF THE DRAWINGS

FIG. 1 is a longitudinal sectional view of an embodiment of the air bag inflation gas generator according to the present invention.

FIG. 2 is a longitudinal sectional view of the housing body shown in FIG. 1.

FIG. 3 is a top view of the housing body shown in FIG. 1.

FIG. 4 is a longitudinal sectional view of the covering member shown in FIG. 3.

DESCRIPTION OF THE PREFERRED EMBODIMENT OF THE INVENTION

Figure 5:
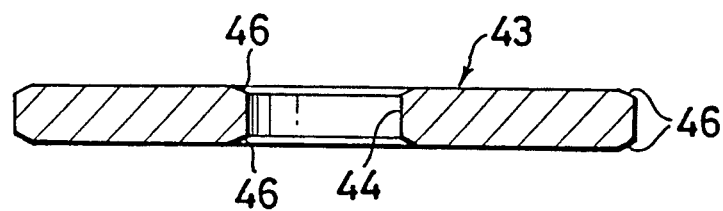
FIG. 5 is a longitudinal sectional view of the gas generating agent shown in FIG. 1.

FIG. 1 shows an embodiment of the air bag inflation gas generator according to the present invention. FIGS. 2 to 4 show a housing of the air bag inflation gas generator in FIG. 1 in detail. In FIG. 1, the reference numeral 41 shows a combustion chamber containing a gas generating agent 43.

In the center of the combustion chamber 41, an igniter 45 and an ignition agent 47 are arranged to burn the gas generating agent 43. The combustion chamber 41 has also a combustion chamber filter 49 on its inner wall.

A plenum chamber 51 annularly surrounds the combustion chamber 41 and receives gas flow from the combustion chamber filter 49.

The plenum chamber 51 contains a plenum chamber filter assembly comprising an upper filter 53 and a gas filter 55, and further includes a plurality of gas outlets 57 to supply the gas flow from the gas filter 55 to an air bag.

According to the present embodiment, the combustion chamber 41 has a housing body 59 comprising a bottom-closed cylinder 61 and a lid 65 which is joined to seal the opening of the bottom-closed cylinder 61 with electron beam welds 63.

In addition to the bottom-closed cylinder 61, as shown in FIGS. 2 and 3, the housing body 59 comprises a flange 67 extending outward and formed integrally with the opening of the cylinder 61, and an external cylinder 71 formed on the periphery of the flange 67 and bent toward the bottom 69 of the housing body 59.

On the edge of the external cylinder 71, a second flange 73 is extending outward and formed integrally with the cylinder 71, and mounting holes 75 for mounting an air bag is formed in the second flange 73.

As shown in FIG. 1, the plenum chamber 51 is formed by covering the external cylinder 71 and the bottom-closed cylinder 61 with a covering member 77 from the bottom 69 of the housing body 59 and by joining the covering member 77 to the cylinders 71 and 61 through electron beam or laser beam welds 79 and 80.

In the present embodiment, as shown in FIGS. 1 and 4, the covering member 77 having an L cross-section is fit on the inner wall of the external cylinder 71 at one end with a bent part 81 at the other end fit to the outer wall of the bottom-closed cylinder 61.

The bottom-closed cylinder 61 has a plurality of orifices 82 (for example, 18 orifices) formed at regular intervals and the covering member 77 also has a plurality of gas outlets 57 (for example, 18 outlets) formed at regular intervals.

The housing body 59, the lid 65, and the covering member 77 of the present embodiment are all made of stainless steel.

It should be appreciated that the number of orifices 82 may be selected from 10 to 20 depending on the desired performance of the gas generator and that those members may be made of aluminum or carbon steel. Further, the orifices 82 may be of circular, elliptical, or rectangular shape and may be arranged on a single circumference or in several rows to strengthen the chamber.

Figure 6:
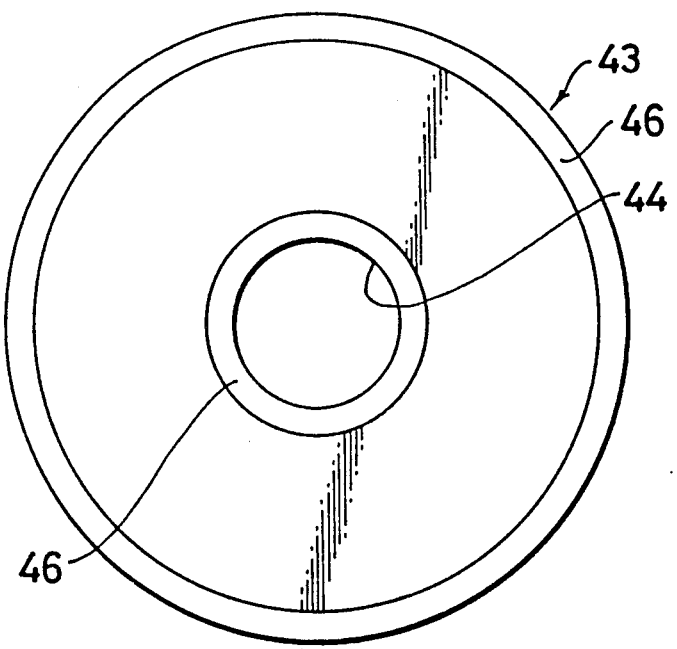
FIG. 6 is a top view of the gas generating agent shown in FIG. 5.

In the combustion chamber 41, 5 or 6 plates (5 plates for the present embodiment) of the gas generating agent 43 are arranged around the igniter 45 and the ignition agent 47. Each plate of the gas generating agent 43 for the present embodiment, as shown in FIGS. 5 and 6, is of annular shape with the through hole 44 formed in the center.

To improve the ignitability of the gas generating agent 43, each plate of the agent 43 has several curved chamfers 46 on the inner and outer circumferences with flat surfaces between the chamfers.

The number of the gas generating agent plates 43 may be selected from 1 to 8 depending on the desired performance. It is desirable that each gas generating agent plate 43 has a drum-like shape with thinner ends and a thicker center portion or each plate has two parallel surfaces with the ends chamfered. If necessary, however, the annular agent plate may be divided into 2 to 4 equal sectors.

The gas generating agent 43 contains, for example, 62 wt % of sodium azide, 28 wt % of iron oxide, 8 wt % of potassium perchlorate, and 2 wt % of soldering glass. Each plate of the agent 43 according to the present embodiment is obtained by charging 18 g of particulate matter having this composition into an annular mold for press molding under a pressure of 40 to 60 tons.

Thus obtained plates of the gas generating agent 43 are piled up, and the igniter 45 and the ignition agent 47 are arranged in the through hole 44 formed in the center of the agent 43.

Those gas generating agent plates 43 are separated by separators 83.

Those separators 83, which are made of annular stainless steel wire net having wire gauge Nos. 20 to 30, provide improved ignitability of the gas generating agent 43 and secure exhaust passages for the combustion gas.

Figure 7:
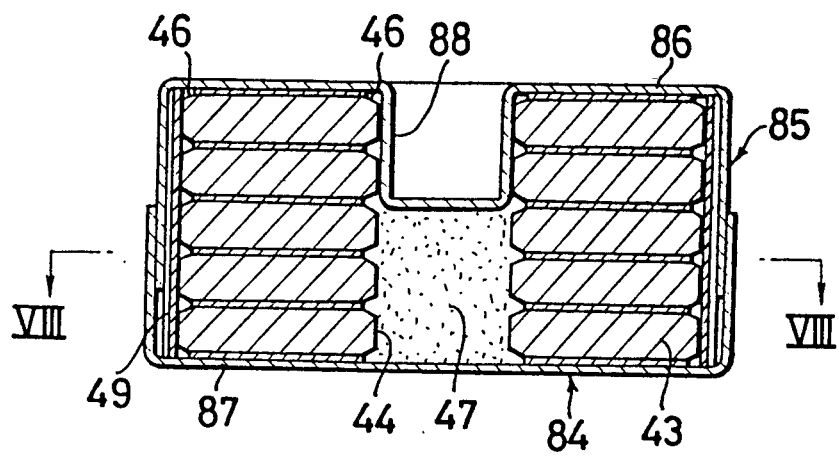
FIG. 7 is a longitudinal sectional view of the gas generating agent pack shown in FIG. 1.
Figure 8:
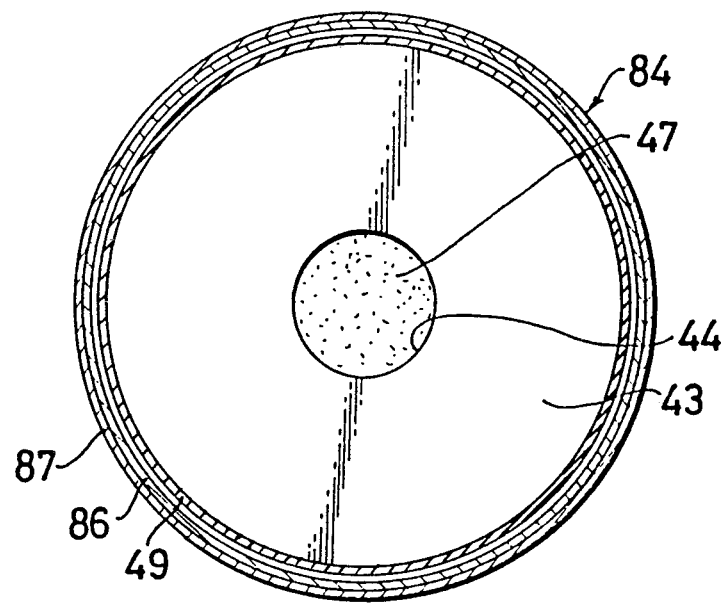
FIG. 8 is a transverse sectional view taken on line VIII—VIII of the gas generating agent pack shown in FIG. 7.

In the present embodiment, as shown in FIGS. 7 and 8, the gas generating agent 43, the separators 83, the ignition agent 47 and the combustion chamber filter 49 are enclosed in a sealed vessel 85 to prevent moisture absorption of the gas generating agent 43 and the ignition agent 47.

The sealed vessel 85 is made of fire retardant thermoplastics such as polypropylene, glass-filled nylon, polycarbonate, polyacetal, polysulfone, or polyethylene terephthalate, and fire retardant thermosetting resin such as epoxy, phenolic resin, or polyphenyl peroxide, or aluminum. The vessel 85, as shown in FIG. 7, has a top cover 86 and a bottom cover 87 fitted to each other and sealed through ultrasonic bonding or hot-melt welding. However, if the vessel 85 is made of aluminum, it may be sealed through screwing, adhesion, or electron beam welding.

The top cover 86 of the sealed vessel 85 has, in its center, a hole 88, i.e. depression, which is depressed toward the through hole in the gas generating agent 43 to hold the igniter 45.

In the center of the gas generating agent 43, the ignition agent 47 is charged. The ignition agent 47 for the present embodiment is obtained by agglomerating polytetrafluoro ethylene with a low polymerized polychlorotrifluoro ethylene, such as "Viton-B" manufactured by Dupont.

The ignition agent 47 is an agglomerating-substance made of, for example, 60 wt % of magnesium, 40 wt % of polytetrafluoro ethylene, and 7.5 wt % (outer percentage) of low polymerized polychlorotrifluoro ethylene.

This type of ignition agent used for the present embodiment in an amount of 1.1 g results in a calorific value of 1940 cal/g and a gas yield of 41 cc/g in combustion, which are higher in calorie and lower in gas yield as compared with a conventional boron-potassium nitrate ignition agent (calorific value: 1790 cal/g, gas yield: 79 cc/g). Thus the gas generating agent 43 may not be broken by any excessive pressure and heat during an explosion of the ignition agent and can provide assured inflation performance without delay.

Figure 13:
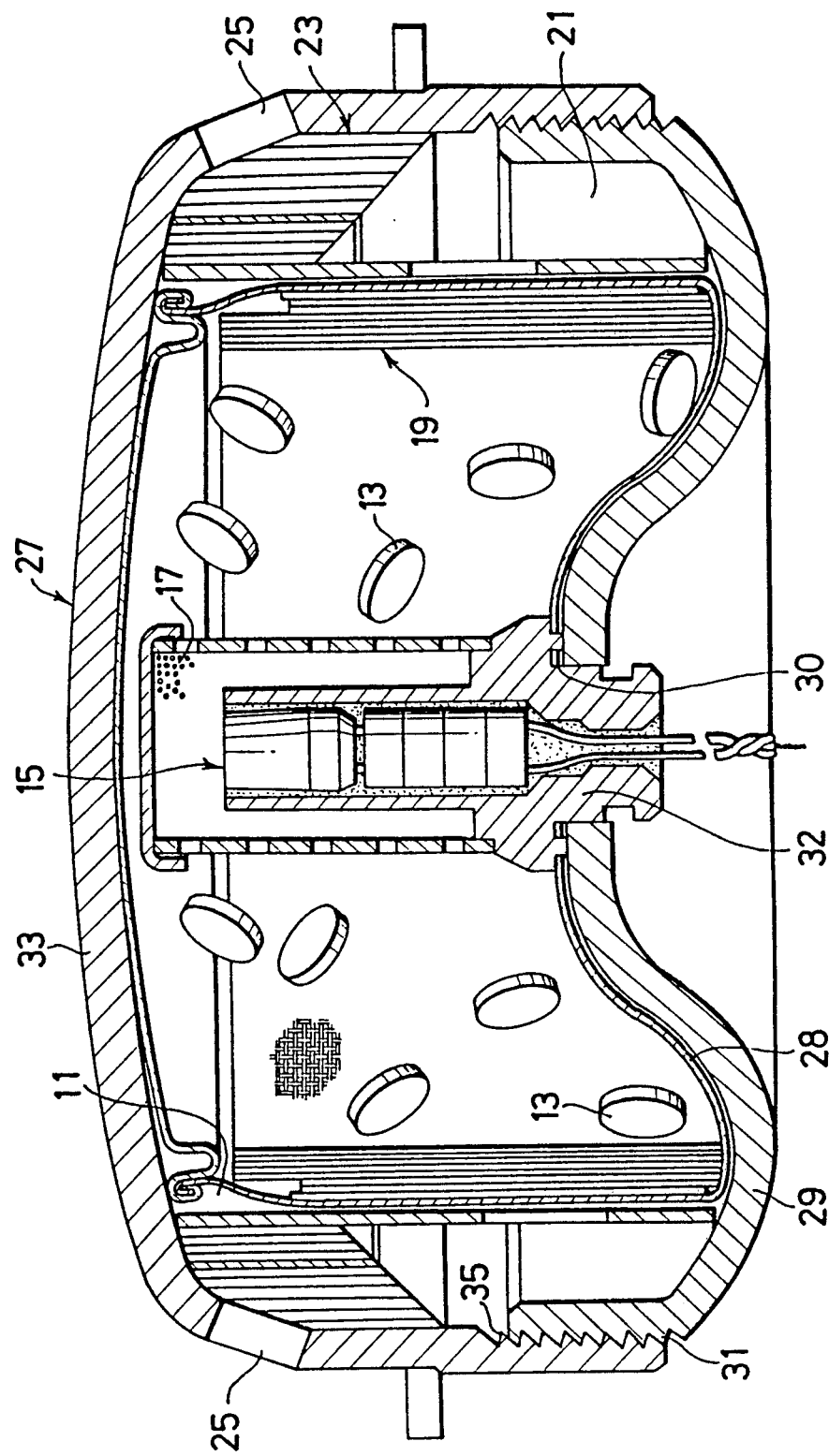
FIG. 13 is a longitudinal sectional view of a prior air bag inflation gas generator.

More specifically, if the gas generating agent 43 for the present embodiment is ignited in a similar manner to that of the prior air bag inflation gas generator shown in FIG. 13, the agent 43 may be broken due to its annular shape to cause abnormal combustion or the agent 43 may be ignited ununiformly even with little breakage. In the present embodiment, however, the ignition agent 47 which is obtained by agglomerating magnesium and polytetrafluoro ethylene with a low polymerized polychlorotrifluoro ethylene, is charged directly in the center of the gas generating agent 43 so that possible breakage of the agent 43 can be avoided without fail.

The ignition agent 47 can be produced as described below.

To obtain, for example, 300 g of the ignition agent 47, 14.2 g of a low polymerized polychlorotrifluoro ethylene is first dissolved in toluene. Then 180 g of magnesium is added to the solution for enough moisturization of magnesium and 120 g of polytetrafluoro ethylene is mixed with moisturized magnesium. Thus obtained mixture is passed through a 12-mesh screen five times and then dried. The dry mixture is agitated with a mixer to produce the ignition agent of agglomerating type.

Figure 9:
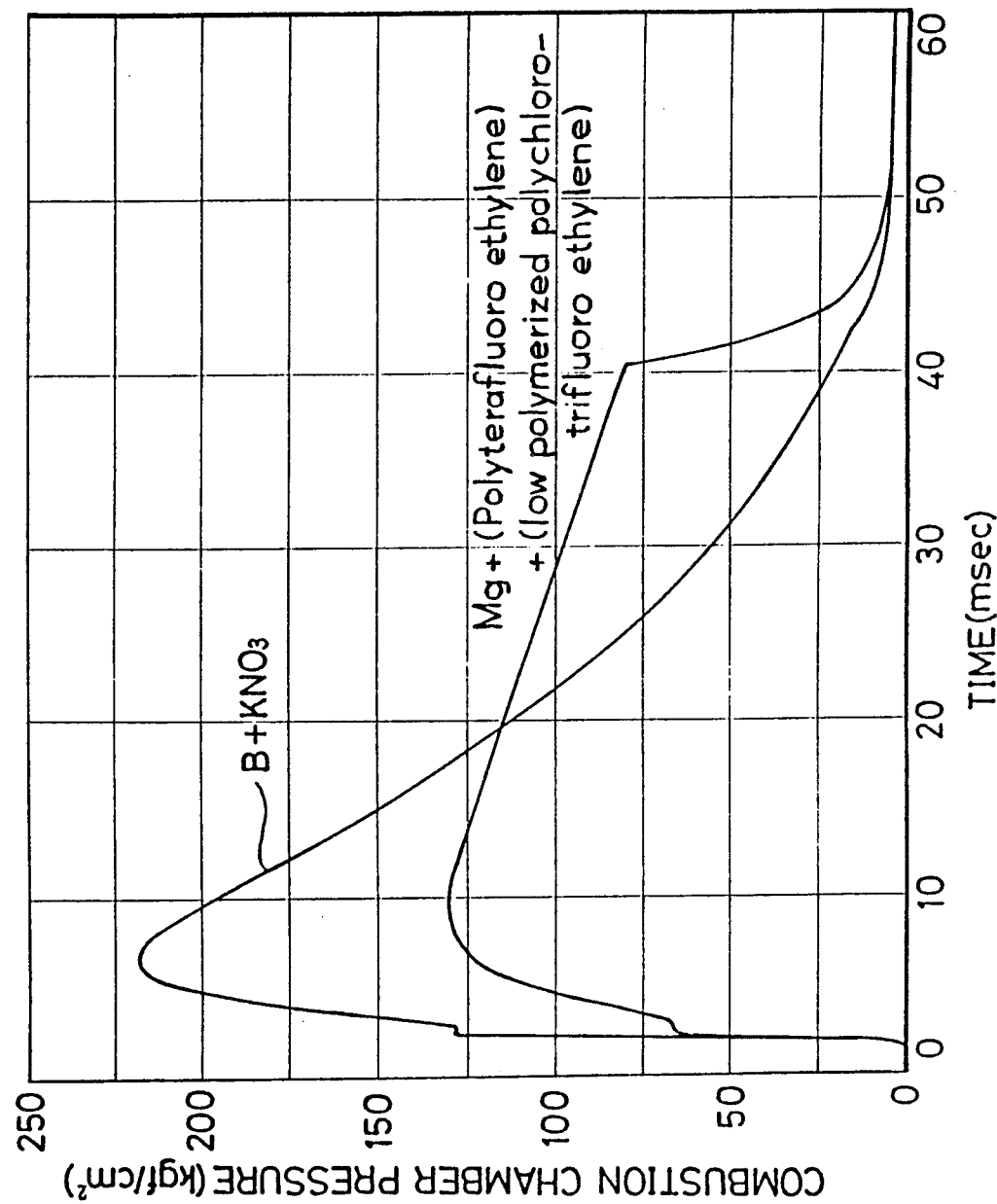
FIG. 9 is a graph showing the performance of the ignition agent.

FIG. 9 shows curves for combustion pressure of a prior ignition agent (a mixture of metal boron and potassium nitrate, $B+KNO_3$) and the present ignition agent 47 described above.

The vertical axis in the drawing shows pressures in the combustion chamber 41 where a certain type of gas generating agent 43 is ignited with the prior or present ignition agent. As can be seen from the drawing, the ignition agent of $B+KNO_3$ produces a pressure of 218 kg/cm$^2$ while the present ignition agent 47 containing magnesium, polytetrafluoro ethylene and a low polymerized polychlorotrifluoro ethylene produces a pressure of 130 kg/cm$^2$.

This is because the $B+KNO_3$ ignition agent produces a higher gas yield and a higher initial ignition pressure, resulting in some breakage in the gas generating agent 43. Consequently, the agent raises the combustion pressure high within a shorter period of combustion.

On the other hand, the ignition agent 47 shows a normal combustion pressure curve with lower resultant pressures and no breakage.

In the sealed vessel 85, the combustion chamber filter (first filter) 49 is arranged around the gas generating agent 43 as shown in FIGS. 7 and 8.

The combustion chamber filter 49 consists of stainless steel wire net of mesh sizes 10 to 35 wrapping around the gas generating agent 43 and has the following functions:

1) To cool the combustion gas generated from the gas generating agent 43 for easy capture of any combustion products by the filter.

2) To serve as a cushion against possible vibration and shock. If the gas generating agent 43 is broken, the surface area of the agent increases and abnormal combustion may occur. The combustion chamber filter 49 can avoid possible breakage of the gas generating agent 43 which may be caused by any accidental drop of the air bag inflation gas generator before installation or by persistent after installation.

3) To catch any combustion products.

4) To hold the gas generating agent 43 and to ensure exhaust passages for the combustion gas. With no exhaust passage, high pressure built up in the housing may destroy the gas generator.

The plenum chamber 51 is divided into two compartments with a partition 89 as shown in FIG. 1. The upper compartment contains the upper filter (second filter) 53 while the lower compartment contains the gas filter (third filter) 55.

The partition 89 is made of, for example, stainless steel or aluminum and is press-fitted to the covering member 77 along its inner wall. The partition 89 serves to receive the combustion gas flow which comes from the upper filter 53 in the plenum chamber 51 through the combustion chamber filter 49, and to divert the gas flow to the gas filter 55.

The upper filter 53, which is arranged to face the orifices 82 formed in the housing body 59, is formed by press molding stainless steel demister wire mesh with a ring mold. Since the combustion gas flow bursting out of the orifices 82 at a high rate dashes into the slag screen, the upper filter 53 serves to change the gas flow into turbulent flow so that any combustion gas residue may get caught in the filter.

The gas filter 55 cools down the combustion gas to such a low temperature that the air bag may not be fired, removes any combustion residue contained in the gas, and feeds only nitrogen gas harmless to the air bag.

Figure 10:
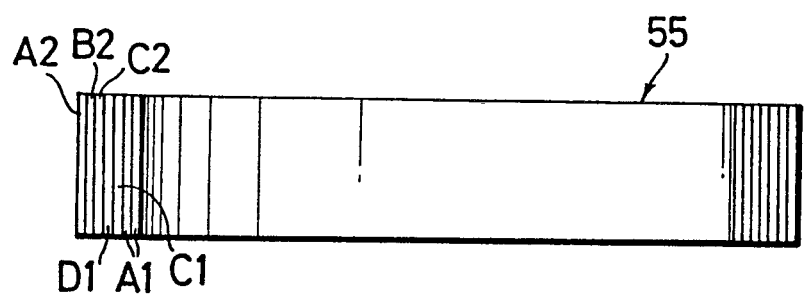
FIG. 10 is a longitudinal sectional view of the gas filter shown in FIG. 1.
Figure 11:
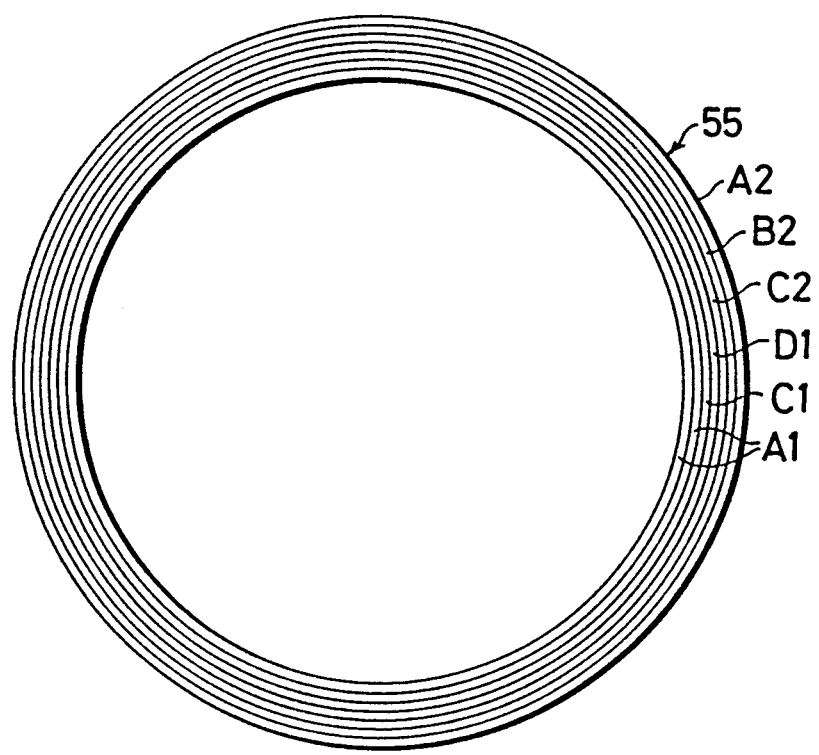
FIG. 11 is a top view of the gas filter shown in FIG. 10.

As shown in FIGS. 10 and 11, the gas filter 55 comprises wire gauze A1, sintered metal fiber cloth C1, an inorganic fiber sheet D1, another sintered metal fiber cloth C2, woven metal wire B2, and another wire gauze A2, which are laid one on top of another in that order to produce a layered construction.

It should be noted that heat-resistant porous material such as sintered ceramic, nickel, or nickel chrome alloy may be used in place of the wire gauze A1.

Figure 12:
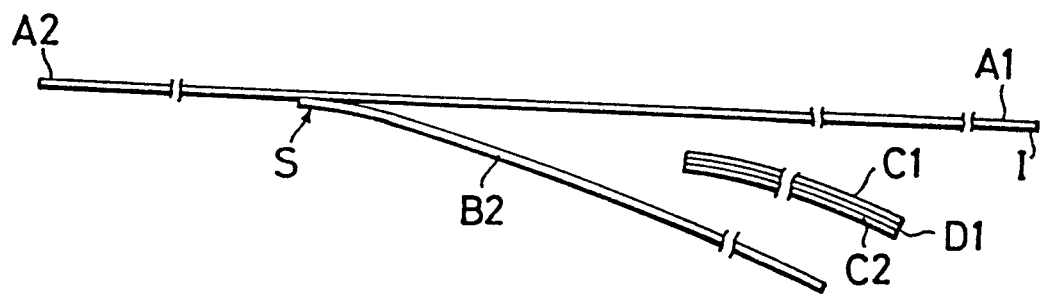
FIG. 12 is an illustration showing a production method for the gas filter.

To produce the gas filter 55, the wire gauze A1 and A2 is first wound around beginning at the innermost end I as shown in FIG. 12. On the wire gauze A1 and A2, the woven metal wire B2 has been joined through spot welding at a point S, for example, 3 m away from the end I. During winding the gauze A1 and A2, the woven metal wire B2 and the sintered metal fiber cloth C1 and C2 are wound together with the inorganic fiber sheet D1 sandwiched between the cloth C1 and C2. The rest of the wire gauze A2 succeeding the weld point S is wound around further two to four times to make the filter stronger. Lastly, the other (outermost) end of the wire gauze A2 is fastened with two to ten spot welds.

The wire gauze A1 and A2 is formed by winding stainless steel woven wire of 10 to 45 meshes several times into a cylinder and serves to cool the combustion gas to supply a required volume of gas for proper inflation of the air bag.

The woven metal wire B2 made of, for example, stainless steel woven wire is wound around the sintered metal fiber cloth to support the cloth and strengthen the filter, and moreover to disperse the gas flow in turbulence.

The inorganic fiber sheet D1, which is wound inside the woven metal wire B1 through the sintered metal fiber cloth C1, serves to remove from the combustion gas any sodium oxide and sodium metal fine powder which may cause irritating odor.

The sintered metal fiber cloth C1 and C2 are wound in contact with the inner and outer walls of the inorganic fiber sheet D1 and the cloth C1 and C2 cooperate with the woven metal wire B2 to protect the sheet D1 from the gas flow.

Outside the inorganic fiber sheet D1, the sintered metal fiber cloth C2, the woven metal wire B2 and the wire gauze A2 are together wound around for additional protection as described above.

The sintered metal fiber cloth C1 and C2 are formed to have 0.2–1.0 mm in thickness by pressure-sintering 500 g/m$^2$ of stainless steel filament having a wire diameter of 4 to 8 $\mu$m and the resultant void volume is 65 to 90%.

As shown in FIG. 1, packings 91 are arranged over and under the gas filter 55 to prevent possible gas leakage from the filter 55.

The packings 91 are of heat-resistant nonflammable material such as silicone rubber with a thickness of 0.6 to 2.0 mm to avoid possible fire damage of the packings.

The igniter 45, as shown in FIG. 1, is supported by a plug 93 screwed in the through hole in the center of the lid 65, and the plug 93 is filled with a seat member 95.

In the air bag inflation gas generator as described above, the ignition agent 47 is burnt when the igniter 45 is energized and this burning in turn causes the gas generating agent 43 to be burnt. The gas from the gas generating agent 43 passes through the combustion chamber filter 49 which is arranged on the inner wall of the combustion chamber 41 and flows into the plenum chamber 51. Then the gas flow passes through the upper filter 53 and rushes against the partition 89 which diverts the flow to the gas filter 55 for purification. Thus purified gas flow is fed to the air bag through the gas outlets 57. Therefore, within a very short time of approximately 0.04 second, the air bag can be inflated completely.

As described above in detail, the air bag inflation gas generator according to the present invention includes the combustion chamber 41 comprising the bottom-closed cylinder 61 of the housing body 59 and the lid 65 welded to the opening of the cylinder 61. The housing body 59 comprises, in addition to the bottom-closed cylinder 61, the flange 67 extending outward and formed integrally with the opening of the cylinder 61, and the external cylinder 71 formed on the periphery of the flange 67 and bent toward the bottom 69 of the housing body 59. The plenum chamber 51 is formed by covering the external cylinder 71 and the bottom-closed cylinder 61 of the housing body 59 with the covering member 77 from the bottom 69. In addition, the covering member 77 is welded to the external cylinder 71 and the bottom-closed cylinder 61 of the housing body 59. This construction of the present gas generator eliminates any need for the engagement of external and internal threads which has been used in the prior gas producer to connect the housing. Consequently, the thickness of the housing body 59 and the covering member 77 can be reduced drastically and a lighter and smaller air bag inflation gas generator can be provided.

In the above embodiment, the lid 65 is bonded to the housing body 59 through the electron beam welds 63, and the covering member 77 is bonded to the housing body 59 through the electron beam or laser welds 79 and 80. This can avoid heating the ignition agent 47 during the welding.

The welding of the lid 6 to the housing body 59 is performed after installation of the high-ignitable ignition agent 47. Accordingly, electron beam welding is desirable to concentrate the welding arc to minimize possible penetration of the welded material.

Furthermore, the electron beam welding performed under high vacuum ensures safer welding even if some failure causes the beam to intrude into the gas generating agent 43, resulting in its accidental combustion, since the combustion can be stopped at once by powering off the electron beam. In addition to this, the concentrated beam is helpful to suppress any increase in ambient temperature for assured safety.

The L-shaped covering member 77 has one end inserted into the external cylinder 71 of the housing body 59 with the bent part 81 on the other end abutting against the outer wall of the bottom-closed cylinder 61. This construction allows the covering member 77 to be held securely by the inner wall of the external cylinder 71 and the bent part 81, resulting in firm bonding between the covering member 77 and the housing body 59.

The piled annular plates which form the gas generating agent 43 for the present embodiment make the combustion chamber 41 much smaller. That construction in cooperation with the housing shape contributes to development of a very small air bag inflation gas generator.

The lid 65 of the present air bag inflation gas generator is arranged on the opposite side of the driver and is designed to pop out under abnormal combustion pressure. This prevents any broken pieces of the generator from hitting the driver as an additional protection.

The gas generating agent 43 arranged in the combustion chamber of the present air bag inflation gas generator is formed in a pile of annular plates with the through hole 44 holding the igniter 45 and the ignition agent 47. As compared with the prior gas generator which has the combustion chamber 41 containing a large number of granules or pellets of gas generating agent 43, the voids can be much reduced. This makes the combustion chamber 41 as well as the gas generator itself much smaller according to the present invention.

Also in the combustion chamber, the separators 83 are arranged between the annular plates of the gas generating agent 43, so that good ignitability of the agent 43 and enough exhaust passages for the combustion gas can be secured.

The housing according to the present invention comprises the housing body 59, the lid 65 and the covering member 65 and they are all welded to each other. This housing construction plus the combustion chamber construction as described above also make the present gas generator much smaller than the prior ones.

Moreover, the gas generating agent pack 84 comprising five annular plates of the gas generating agent 43 with the through hole 44, in which the ignition agent 47 is arranged, is enclosed within the sealed vessel 85. This simple construction provides secure sealing for the gas generating agent 43 and the ignition agent 47.

More specifically, according to the present invention, there is no need for a through hole to be provided in the agent containing cartridge to support the plug. Therefore, secure sealing for both the agents 43, 47 can be attained by such a simple construction.

In the center of the sealed vessel 85 of the present invention, the hole 44 is formed to hold the igniter 45. This hole allows easy and secure setting of the igniter 45 adjacent to the ignition agent 47.

The ignition agent 47 used in the gas generating agent pack 84 is of a type obtained by agglomerating magnesium and polytetrafluoro ethylene with a low polymerized polychlorotrifluoro ethylene. Therefore, the ignition agent 47 can be charged directly in the through hole 44 of the gas generating agent 43.

As described above, the present embodiment has the sealed vessel 85 containing the combustion chamber filter 49, however, it should be understood that the present invention is not limited to the embodiment and of course, the combustion chamber filter 49 may be arranged outside the sealed vessel 85.

The gas filter 55 for the present air bag inflation gas generator comprises the wire gauze A1 wound around several times into a cylinder shape to cool and disperse the generated gas in turbulence, the inorganic fiber sheet D1 wound outside the wire gauze A1 to remove any fine powder from the gas, the sintered metal fiber cloth C1 and C2 wound around sandwiching the inorganic fiber sheet D1 to protect the sheet D1 from the gas flow, the woven metal wire B2 wound around outside the outer sintered metal fiber cloth C2 to support the cloth for reinforcement of the filter and to disperse the gas in turbulence, and another wire gauze A2 wound around outside the metal wire B2 to cool the gas and to strengthen the filter. The wire gauzes A1 and A2 are mainly intended to cool the combustion gas and disperse it in turbulence. The inorganic fiber sheet D1 is mainly intended to remove $Na_2O$ and fumed Na metal from the gas. The sintered metal fiber cloth C1 and C2 are mainly intended to protect the inorganic fiber sheet D1 from the gas flow. The woven metal wire B2 is intended to strengthen the filter.

With the gas filter 55 comprising as above, the combustion gas can be properly cooled, dispersed, and filtered.

According to the present gas filter 55, the gas temperature can be easily adjusted by controlling the number of turns of the wire gauze A1.

Further, the gas filter 55 catches any residue in the combustion gas through the wire gauze A1 and the metal fiber cloth to prevent such residue from adhering to the inorganic fiber sheet D1. Therefore, the ventilation resistance of the filter can be kept constant to reduce possible ununiformity in cooling, dispersion, and filtration performance of the filter.

As described above in detail, the present embodiment has the inorganic fiber sheet D1 sandwiched between the sintered metal fiber cloth, however, it should be understood that the present invention is not limited to the embodiment. Of course, the inorganic fiber sheet D1 may be sandwiched between two porous ceramic filters or two or more porous sintered metal filters, or a combination of two selected among from sintered metal fiber cloth, porous ceramic filters, and porous sintered metal filters.

We claim:

1. As air bag inflation gas generator comprising a combustion chamber containing a gas generating agent, an igniter and an ignition agent arranged in the center of said combustion chamber to burn said gas generating agent, a combustion chamber filter arranged along an inner wall of said combustion chamber, a plenum chamber annularly surrounding and communicating with said combustion chamber to receive gas flow from said combustion chamber filter, a plenum chamber filter contained in said plenum chamber, and gas outlets provided with said plenum chamber to feed the gas flow from said plenum chamber filter to an air bag, wherein:

said combustion chamber comprises a one-piece bottom-closed cylinder of a housing body and a lid welded to seal the opening of said bottom-closed cylinder, said lid receiving said igniter, said housing body comprises a flange extending outward and formed integrally, in one-piece, with the opening of said bottom-closed cylinder, and an external cylinder formed on the periphery of said flange and bent toward the bottom of said housing body, said plenum chamber is formed by covering said external and bottom-closed cylinders with a covering member from the bottom of said housing body, and said covering member is welded to said external and bottom-closed cylinders.

2. An air bag inflation gas generator according to claim 1, wherein said lid is welded to said housing body through electron beam welding.

3. An air bag inflation gas generator according to claim 1, wherein said gas generating agent is formed in a plurality of annular plates having a through hole, these annular plates are piled up, and said igniter and said ignition agent are arranged in said through hole.

4. An air bag inflation gas generator according to claim 1, wherein said gas generating agent is in the form of annular plates and a plurality of separators are arranged between the annular plates of said gas generating agent.

5. An air bag inflation gas generator according to claim 1, wherein said gas generating agent comprises stacked plates of gas generating agent separated by separators.

6. An air bag inflation gas generator according to claim 3, wherein the annular plates of said gas generating agent are piled up with the through hole formed in the center to hold said ignition agent, and said gas generating agent and said ignition agent are enclosed in a sealed vessel.

7. An air bag inflation gas generator according to claim 6, wherein said sealed vessel has its center provided with a hole depressed into the through hole of said gas generating agent to hold said igniter.

8. An air bag inflation gas generator according to claim 5, wherein said ignition agent is obtained by agglomerating magnesium and polytetrafluoro ethylene with a low polymerized polychlorotrifluoro ethylene.

* * * * *

UNITED STATES PATENT AND TRADEMARK OFFICE
CERTIFICATE OF CORRECTION

PATENT NO. : 5,062,367
DATED : November 5, 1991
INVENTOR(S) : M. Hayashi et al It is certified that error appears in the above-identified patent and that said Letters Patent is hereby corrected as shown below:

On the title page, Item [73]

"Assignee: Nippon Koki, Co., Ltd., Tokyo, Japan" with

--Assignees: Nippon Koki Co., Ltd. and Honda Giken Kogyo Kabushiki Kaisha, Tokyo, Japan--

Signed and Sealed this

Nineteenth Day of December, 1995

Attest:

BRUCE LEHMAN

Attesting Officer

Commissioner of Patents and Trademarks